(12) United States Patent
Feinstein

(10) Patent No.: US 8,932,536 B2
(45) Date of Patent: Jan. 13, 2015

(54) REACTOR PACKING

(75) Inventor: Jonathan Jay Feinstein, North Salem, NY (US)

(73) Assignee: Zoneflow Reactor Technologies, LLC, Windsor, CT (US)

(*) Notice: Subject to any disclaimer, the term of this patent is extended or adjusted under 35 U.S.C. 154(b) by 411 days.

(21) Appl. No.: 13/453,275

(22) Filed: Apr. 23, 2012

(65) Prior Publication Data

US 2012/0288420 A1 Nov. 15, 2012

Related U.S. Application Data

(60) Provisional application No. 61/518,703, filed on May 10, 2011, provisional application No. 61/626,201, filed on Sep. 22, 2011.

(51) Int. Cl.
*B01J 19/32* (2006.01)

(52) U.S. Cl.
CPC ............... *B01J 19/32* (2013.01); *B01J 19/325* (2013.01); *B01J 2219/32206* (2013.01); *B01J 2219/3221* (2013.01); *B01J 2219/32234* (2013.01); *B01J 2219/32237* (2013.01); *B01J 2219/32272* (2013.01); *B01J 2219/32275* (2013.01); *B01J 2219/32408* (2013.01); *B01J 2219/32466* (2013.01)
USPC .......................................... 422/310; 422/222

(58) Field of Classification Search
CPC ..................... B01J 19/325; B01J 2219/32206; B01J 2219/3221; B01J 19/32237; B01J 2219/32234; B01J 2219/32272; B01J 2219/32275; B01J 2219/32466

USPC .................................................. 422/310, 222
See application file for complete search history.

(56) References Cited

U.S. PATENT DOCUMENTS

| 6,139,810 A | 10/2000 | Gottzmann et al. |
|---|---|---|
| 2005/0017381 A1 | 1/2005 | Armstrong et al. |
| 2006/0019827 A1 | 1/2006 | Whittenberger |
| 2007/0025893 A1 | 2/2007 | Whittenberger et al. |
| 2008/0145284 A1* | 6/2008 | Whittenberger et al. ..... 422/188 |
| 2008/0159931 A1* | 7/2008 | Feinstein ..................... 422/222 |
| 2008/0286177 A1 | 11/2008 | Feinstein |
| 2009/0035200 A1 | 2/2009 | Downs et al. |

(Continued)

FOREIGN PATENT DOCUMENTS

EP 1 857 174 A1 11/2007

OTHER PUBLICATIONS

International Preliminary Report on Patentability dated Nov. 12, 2013 issued by the International Seaching Authority in related International Application PCT/US2012/034763 (1 Page).

(Continued)

*Primary Examiner* — Lessanework Seifu
(74) *Attorney, Agent, or Firm* — Lucas & Mercanti LLP; Robert P. Michal

(57) ABSTRACT

A structured packing for insertion in a reactor having an inlet, an outlet, a wall and an axis. The packing comprises a first part, i.e., a reactor core and a second part, i.e., a reactor casing. The second part is free to move relative to the first part. The first part and the second part are inserted in the reactor such that the first part is located proximate the axis and the second part is located between the first part and the reactor wall. In general, the second part will be in contact with the reactor wall.

16 Claims, 1 Drawing Sheet

(56) References Cited

U.S. PATENT DOCUMENTS

2010/0040190 A1    2/2010    Tentarelli
2010/0202942 A1    8/2010    Feinstein

OTHER PUBLICATIONS

Written Opinion of the International Searching Authority issued in related International Application PCT/US2012/034763 mailed Nov. 23, 2012 (3 pages).

International Search Report of the International Searching Authority issued in related International Application PCT/US2012/034763 mailed Nov. 23, 2012 (3 pages).

Extended European search report dated Oct. 6, 2014 issued by the European Patent Office in connection with European Patent Application No. EP 12 78 1592.6 (6 pages).

* cited by examiner

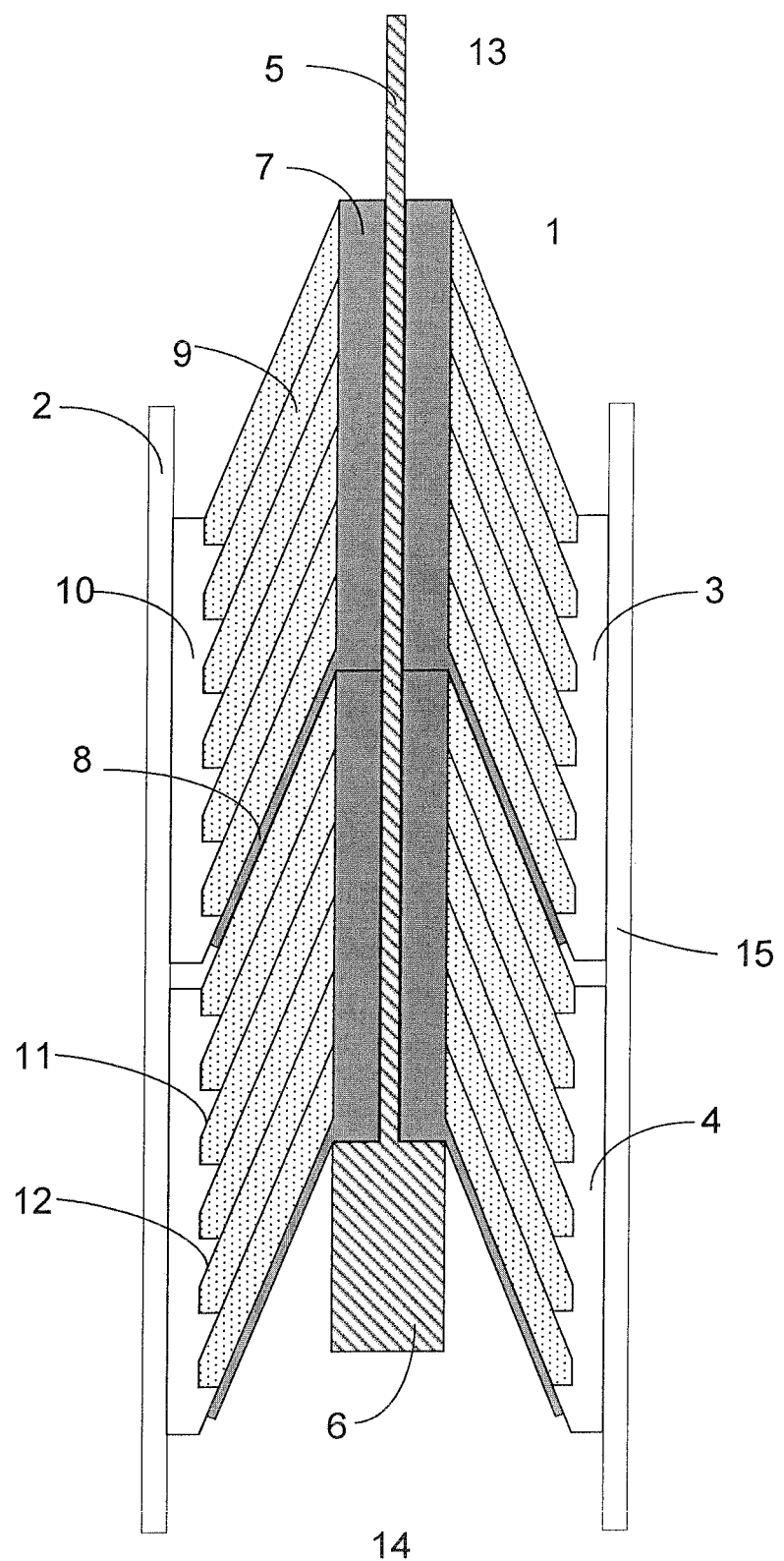

REACTOR PACKING

CROSS REFERENCE TO RELATED APPLICATIONS

This application claims priority of U.S. Provisional Application Ser. No. 61/518,703 filed May 10, 2011 and U.S. Provisional Application Ser. No. 61/626,201 filed Sep. 22, 2011, the entire contents of each of which is incorporated herein by reference.

FIELD OF THE INVENTION

The invention pertains to a structured packing for a reactor.

BACKGROUND OF THE INVENTION

Random reactor packings provide good heat transfer between a reactor wall and fluid passing through the reactor. The particles in the packing randomly direct the fluid to flow in various directions, including impingement upon the reactor wall. Such impingement results in an increase in the heat transfer coefficient across the boundary layer at the reactor wall. The diversion of fluid to impinge the wall of a reactor while the bulk of the fluid generally flows parallel to the wall of the reactor is most effective when the packing is closest to, or preferably in contact with, the wall, as this interrupts fluid from flowing parallel to the wall, which would otherwise cause the heat transfer coefficient across the boundary layer to be relatively low.

Random packings have the advantage over structured packings in that the particles are free to move relative to each other to fill gaps between the particles and between the particles and the reactor wall. Such gaps are undesirable in that they lower the coefficient of heat transfer between the reactor wall and fluid within the reactor.

Structured packings have advantages over random packings in that they may have a higher void volume than random packings. Such higher void volume associated with structured packings results in a lower pressure drop. Structured packings can designed to direct fluid to flow in the most advantageous directions for enhancement of heat transfer between the reactor and its environment. Such advantageous directions are, e.g., normal to the reactor wall, towards the wall to impinge upon it, or away from the wall to balance the mass flow to and from the wall.

Structured packings can be designed to have a certain distance, space or gap between the packing and the inner reactor wall to facilitate insertion of the packing into the reactor. Structured packings designed to have such gaps may incorporate separate internal mechanical devices to move in an outward radial direction to force the outer portion of the structured packing to move toward the reactor wall. Structured packings also are more prone to separate from the reactor wall, thereby resulting in a lower heat transfer coefficient through the boundary layer at the wall than when there is no gap.

OBJECTS OF THE INVENTION

It is an object of the invention to provide a structured packing thereby improving the transfer of heat between the reactor and its environment.

It is a further object of the invention to provide a structured packing that will result in a reduction of pressure drop across the reactor.

It is yet another object of the invention to provide a structured packing that will maintain contact with, or a close tolerance to, the reactor wall during the insertion of the structured packing into the reactor and throughout the service life of the reactor without any internal device moving in a radial direction to force the outer portion of the structured packing toward the reactor wall.

The foregoing objects and other objects will be apparent to those skilled in the art based upon the disclosure set forth below.

SUMMARY OF THE INVENTION

A structured packing is provided for use in a reactor having an inlet, an outlet, a wall and an axis. Preferably, the reactor has a tubular configuration. The reactor may be a catalytic reactor in which at least part of the structured packing is coated with a catalyst suitable for the reaction that is to take place within the reactor.

The packing comprises a first part and a second part wherein the second part is free to move relative to the first part such that movement of the second part relative to the first part results in an increase of the diameter of the second part.

The first part, i.e., the reactor core, is located proximate the reactor axis and is substantially rigid. The second part, i.e., the reactor casing, is located between the core and the reactor wall and is sufficiently flexible to assume an outer dimension that conforms to the reactor wall.

Preferably, the first part has at least one outer surface and/or outer edge oriented at an oblique angle to the reactor wall and in which the second part can move along the outer surface and/or outer edge. Typically, movement of the second part along the outer surface and/or outer edge causes the second part to change its outer peripheral length. The oblique angle may have a value of about 1 to about 80°, preferably 5 to 35°.

It is preferred the second part have at least one inner surface and/or inner edge oriented at an oblique angle to the reactor wall and such that the first part can move along the inner surface and/or inner edge. Typically, movement of the first part along the inner surface and/or inner edge causes the second part to change its outer peripheral length. The oblique angle may have a value of about 1 to about 80°, preferably 5 to 35°.

Preferably, the reactor tube and axis are vertical, the first part is stationary and the second part is induced to move downward by the forces of gravity and differential pressure of downward-flowing fluid through the reactor to cause the second part to approach, and preferably contact, the reactor wall.

Alternatively, the motion of the second part to the first part could be in a direction other than axial to effect the expansion of the second part. An example of such alternative motion is a spiral or helical movement.

Preferably, reactor is a catalytic reactor and at least part of the packing will be coated with a catalyst suitable for the reaction that is to be carried out in the reactor.

BRIEF DESCRIPTION OF THE DRAWINGS

FIG. 1 is a longitudinal cross-sectional view of one of the embodiments of the invention.

DETAILED DESCRIPTION OF THE DRAWING

Referring to FIG. 1, structured packing 1 is contained within a reactor having a wall 2. Packing 1 consists of a series of modules 3 and 4 mounted on central rod 5 which rests on support platform 6 (rod 5 and platform 6 are illustrated as a cross-hatched area). Each module consists of a sleeve 7 (shown as a gray area) which is a thick-walled cylindrical member having a conical base 8 affixed to its bottom region, a core 9 (illustrated by dotted areas) and a casing 10.

Modules 3 and 4 slide onto rod 5 and nest within each other to fill the reactor volume. Core 9 consists of a series of nested, alternating smooth and corrugated cones (the corrugated cones act as standoffs between the smooth cones). The smooth and corrugated cones may be perforated to permit the flow of fluid through them or they may be solid to impede or prevent the flow of fluid through core 9.

Core 9 and casing 10 abut each other along edges and/or surfaces which are at an oblique angle to wall 2 in the form of frusto-conical surfaces. Core 9 is substantially rigid. Casing 10 is sufficiently flexible to be capable of both circumferential and radial expansion. By way of example, casing 10 may be a corrugated sheet in which the corrugations are aligned with the axis of the reactor and the amplitude of the corrugations is the distance from wall 2 to core 9. By way of further example, casing 10 is wrapped around core 9 and contains oblique cutouts as depicted by line 11 at its inner surface to form edges that abut the oblique upper surfaces of smooth cones (shown by lines 12 in core 9). Alternatively, casing 10 may consist of the type of packing that is disclosed in published patent application US 2010-0202942 A1 which is incorporated herein by reference in its entirety.

All components of the reactor are metal. The sheets are preferably metal foil. The metal foil or other parts of the packing preferably are partially or fully coated with a catalyst suitable for the particular reaction that is to occur within the reactor.

The reactor is oriented vertically. Fluid flows downward through the reactor from inlet 13 to outlet 14. Rod 5, sleeve 7, cone 8 and core 9 are stationary. Casing 10 can be forced downward by both by gravity and the differential pressure of the moving fluid to slide down the oblique edges to thereby cause the outer surface or perimeter 15 of casing 10 to contact reactor wall 2.

The following three embodiments refer to the reactor in FIG. 1 wherein the core 9 is rigid and the casing 10 is flexible and is preferably construct of sheet metal which has sufficient elasticity to enable both the diameter and outer perimeter of casing 10 to be compressed or expanded in outer perimeter length. In the three embodiments discussed below, core 9 and/or casing 10 will typically be partially or completely coated with a catalyst suitable for carrying out the desired reaction within the reactor.

In a first embodiment, casing 10 is of outer perimeter length such that when no force is applied to the casing and prior to its insertion in the reactor, the outer perimeter length is greater (e.g., by about 1 to about 5%) than the inside circumference of the reactor in which casing 10 is inserted. Casing 10 is then squeezed to an outside diameter equal to the inside diameter of the reactor, core 9 is then positioned with respect to casing 10 so as to abut inside surfaces or edges of casing 10 at that outside diameter of casing 10 equal to the inside diameter of the reactor, and casing 10 and core 9 are then inserted as a unit into the reactor.

In a second embodiment, casing 10 is of outer perimeter length such that when no force is applied to the casing and prior to its insertion in the reactor, the outer perimeter length is equal to the inside circumference of the reactor in which casing 10 is inserted. Thus, casing 10 will have an outside diameter equal to the inside diameter of the reactor. Core 9 is then positioned with respect to casing 10 so as to abut inside surfaces or edges of casing 10 at that outside diameter of casing 10 equal to the inside diameter of the reactor, and casing 10 and core 9 are then inserted as a unit into the reactor.

In a third embodiment, casing 10 is of outer perimeter length such that when no force is applied to the casing and prior to insertion in the reactor, the outer perimeter length is less (e.g., by about 1 to about 5%) than the inside circumference of the reactor in which casing 10 is inserted. Casing 10 is then expanded to an outside diameter equal to the inside diameter of the reactor. Core 9 is then positioned with respect to casing 10 so as to abut inside surfaces or edges of casing 10 at that outside diameter of casing 10 equal to the inside diameter of the reactor, and casing 10 and core 9 are then inserted as a unit into the reactor.

Although the present invention has been described in terms of several embodiments, various features of separate embodiments can be combined to form additional embodiments not expressly described. Moreover, other embodiments within the scope of the present invention will be apparent to those skilled in the art. The only limitations on the scope of the invention are those expressly set forth in the claims which follow.

What is claimed is:

1. A structured packing for insertion in a reactor having an inlet, an outlet, a wall and an axis, said packing comprising a first part and a second part wherein the second part is free to move relative to the first part, and wherein the second part has at least one inner surface and/or inner edge oriented at an oblique angle to the reactor wall and in which the first part can move along said inner surface and/or inner edge.

2. The packing of claim 1 wherein the first part and the second part are insertable in the reactor such that the first part is located proximate the axis and the second part is located between the first part and the reactor wall.

3. The packing of claim 2 wherein the second part is in contact with the reactor wall.

4. The packing of claim 2 wherein prior to insertion in the reactor, the second part has an outer peripheral length greater than the inner circumference of the reactor wall.

5. The packing of claim 4 wherein the outer peripheral length of the second part is about 1 to about 5% greater than the inner circumference of the reactor wall.

6. The packing of claim 2 wherein prior to insertion in the reactor, the second part has an outer peripheral length equal to the inner circumference of the reactor wall.

7. The packing of claim 2 wherein prior to insertion in the reactor, the second part has an outer peripheral length of less than the inner circumference of the reactor wall.

8. The packing of claim 7 wherein the outer peripheral length of the second part is about 1 to about 5% less than the inner circumference of the reactor wall.

9. The packing of claim 1 wherein the first part has at least one outer surface and/or outer edge oriented at an oblique angle to the reactor wall and in which the second part can move along said outer surface and/or outer edge.

10. The packing of claim 9 wherein the movement of the second part along the outer surface and/or outer edge causes the second part to change its outer peripheral length.

11. The packing of claim 9 wherein the oblique angle of the first part has a value of about 1 to about 80°.

12. The packing of claim 11 wherein the oblique angle of the first part has a value of about 5 to about 35°.

13. The packing of claim 1 wherein the movement of the first part along the inner surface and/or inner edge causes the second part to change its outer peripheral length.

14. The packing of claim 1 wherein the oblique angle has a value of about 1 to about 80°.

15. The packing of claim 14 wherein the oblique angle has a value of 5 to 35°.

16. The packing of claim 1 wherein the reactor is a catalytic reactor and at least part of the packing is coated with a catalyst suitable for the reaction that is to be carried out in the reactor.

* * * * *